US012746984B2

(12) United States Patent
Hoummadi et al.

(10) Patent No.: US 12,746,984 B2
(45) Date of Patent: Sep. 29, 2026

(54) DEFLECTOR STRUCTURE

(71) Applicant: Volvo Truck Corporation, Gothenburg (SE)

(72) Inventors: Elias Hoummadi, Lyons (FR); Christophe Pras, Chassagny (FR)

(73) Assignee: Volvo Truck Corporation, Gothenburg (SE)

( * ) Notice: Subject to any disclaimer, the term of this patent is extended or adjusted under 35 U.S.C. 154(b) by 353 days.

(21) Appl. No.: 18/394,730

(22) Filed: Dec. 22, 2023

(65) Prior Publication Data

US 2024/0246619 A1 Jul. 25, 2024

(30) Foreign Application Priority Data

Jan. 23, 2023 (EP) .................................... 23152956

(51) Int. Cl.
*B62D 35/00* (2006.01)

(52) U.S. Cl.
CPC .................................. *B62D 35/001* (2013.01)

(58) Field of Classification Search
CPC ............................ B62D 35/004; B62D 35/001
See application file for complete search history.

(56) References Cited

U.S. PATENT DOCUMENTS 3,834,752 A * 9/1974 Cook ....................... B60D 5/00 296/180.2
3,945,677 A * 3/1976 Servais ................ B62D 35/004 296/180.2
4,030,779 A * 6/1977 Johnson ............... B62D 35/004 244/130
4,036,519 A * 7/1977 Servais ................ B62D 35/004 296/180.2
4,290,639 A * 9/1981 Herpel ................. B62D 35/001 296/180.3
4,611,847 A 9/1986 Sullivan
9,637,183 B2 * 5/2017 Conny ................. B62D 35/001
9,873,467 B2 * 1/2018 Wall, II ................ B62D 35/001
10,000,245 B2 * 6/2018 Wall, II ................ B62D 35/001
2012/0126573 A1 * 5/2012 Minbiole ............ B62D 35/001 296/180.2
2015/0115651 A1 * 4/2015 Conboy ............... B62D 35/004 296/180.2
2019/0367104 A1 12/2019 Damon et al.

FOREIGN PATENT DOCUMENTS

FR 2623155 A1 5/1989

OTHER PUBLICATIONS

Extended European Search Report for European Patent Application No. 23152956.1, mailed Jun. 26, 2023, 9 pages.

* cited by examiner

*Primary Examiner* — Aaron L Lembo
(74) *Attorney, Agent, or Firm* — Withrow & Terranova, PLLC

(57) ABSTRACT

A deflector structure for a truck unit having a cab, the deflector structure being configured to form a barrier surrounding at least part of the gap between the cab and a trailer to be towed by the truck unit, the deflector structure comprising a flexible frame fixed to the cab, the flexible frame comprising a plurality of bouncy cushions extending rearwardly towards the trailer at least in an inflated configuration, and at least a flexible canvas held by the flexible frame and/or by the cab and guided by the bouncy cushions to form the barrier.

14 Claims, 7 Drawing Sheets

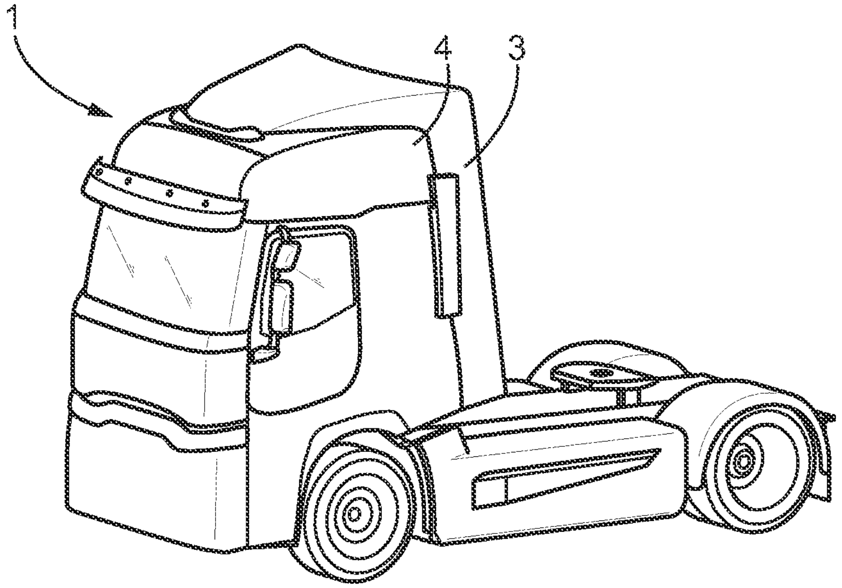
FIG. 1 - Prior art
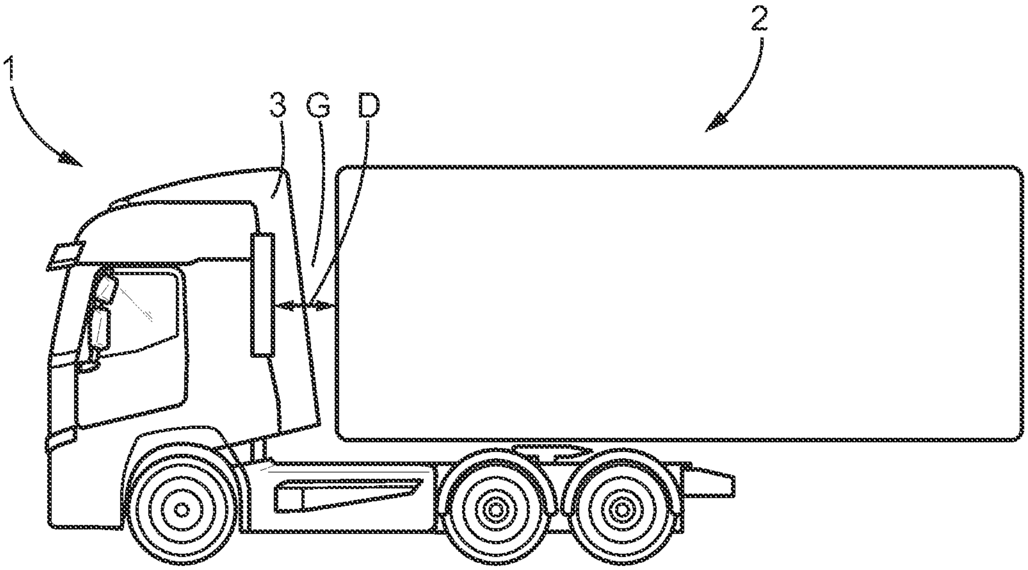
FIG. 2 - Prior art

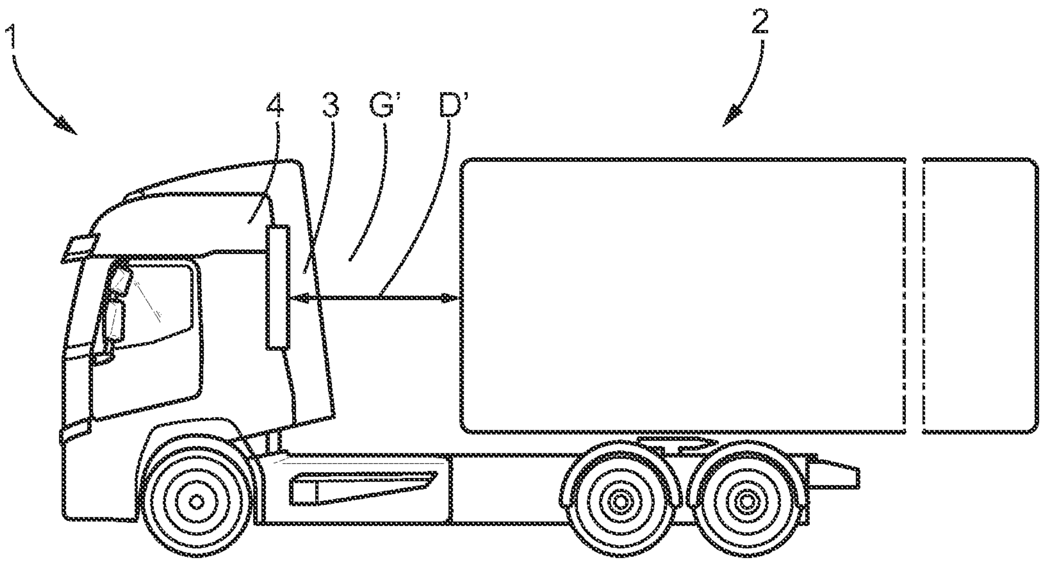
FIG. 3 - Prior art
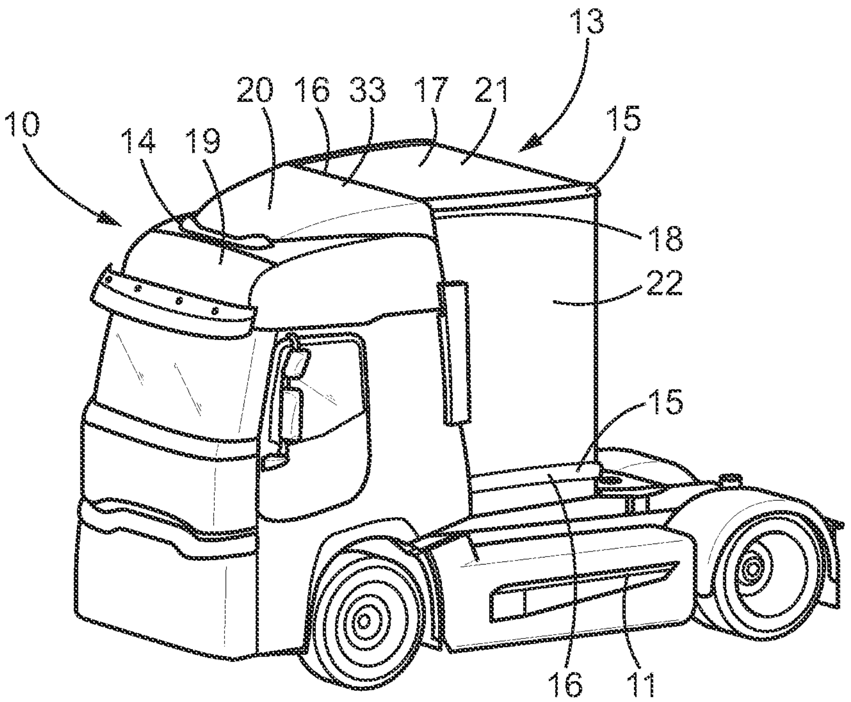
FIG. 4

DEFLECTOR STRUCTURE

PRIORITY APPLICATIONS

The present application claims priority to European Patent Application No. 23152956.1, filed on Jan. 23, 2023, and entitled "DEFLECTOR STRUCTURE," which is incorporated herein by reference in its entirety.

TECHNICAL FIELD

The disclosure relates generally to heavy-duty vehicles, especially to tractor units configured to tow a trailer. In particular aspects, the disclosure relates to a deflector structure for such tractor unit, to a tractor unit comprising such deflector structure and to a method for adjusting such deflector structure.

BACKGROUND

Tractor units are made for towing trailers. Each tractor unit 1, such as the one shown in FIG. 1, may be made for towing trailers 2 of different sizes, one trailer 2 towed by a truck unit 1 being shown in FIG. 2. One main issue in transportation is energy consumption, especially for electric vehicles, which have a very low range compared to fuel vehicles.

Energy consumption is partly related to aerodynamics. In particular, the gap G between the truck cab 4 and the trailer 2 is a source of aerodynamic problems. In order to remedy to the aerodynamic problems, it is known to fix a deflector structure 3 to the upper and rear sides of the truck cab 4. Such a deflector structure 3 covers part of the gap G between the truck cab 4 and the trailer 2, with the double arrow showing the distance D between the truck cab 4 and the trailer 2. The presence of such deflector structure 3 improves the aerodynamics.

However, in battery electrical vehicles, the distance D' between the rear side of the cab and the front side of the trailer is increased as shown in FIG. 3, due to the amount of energy and therefore to the weight of batteries to be integrated in such vehicles. More precisely, an axle has to be added to transport such payload so that it makes the trailer connection even further backward. This increased distance may also be found in some assemblies truck unit-trailer. The known deflector structures 3 are not long enough, as can be seen in FIG. 3, to cover a sufficient part of the increased gap G'. Furthermore, the known deflector structures 3 cannot be modified to cover this increased gap, because their weight would be too heavy for being supported by the cab and/or because the tooling for injecting such deflector parts would be too expensive.

SUMMARY

According to a first aspect of the disclosure, a deflector structure for a truck unit having a cab is disclosed, said deflector structure being configured to form a barrier surrounding at least part of a gap between the cab and a trailer to be towed by the truck unit, the deflector structure comprising:

- a flexible frame fixed to the cab, the flexible frame comprising a plurality of bouncy cushions extending rearwardly towards the trailer at least in an inflated configuration, and

- at least a flexible canvas held by the flexible frame and/or by the cab and guided by the bouncy cushions to form said barrier.

The first aspect of the disclosure may seek to improve ergonomics of the truck unit when towing the trailer, especially but not exclusively when the truck unit is electrically powered. A technical benefit may include a light deflector structure.

The cab may comprise a rear side to which the flexible frame, notably at least part of the bouncy cushions may be fixed. The cab may comprise on an upper side a rigid deflector. At least part of the bouncy cushions may be fixed to a rear side of such rigid deflector.

The flexible canvas may be a cloth, for example a water-repellant cloth, the cloth being waterproof or not, having at least one layer, for example one single layer. The cloth may be made of a synthetic material, for example reinforced on an external side so as to be tear resistant. The flexible canvas may at least partially be fixed to a rear side of the cab and/or to a rigid deflector thereof and/or the flexible canvas may at least partially be fixed to the flexible frame.

The bouncy cushion may be made of a waterproof flexible cloth, for example may be made of the same cloth as the flexible canvas. The bouncy cushion may not be elastically deformable. In another example, the bouncy cushion may be elastically deformable.

In some examples, the flexible frame and the flexible canvas may be made of a single piece.

The bouncy cushion may be inflatable or inflated with gas, especially with ambient air.

The deflector structure may be U-shaped, extending according to three sides, one upper side and two lateral sides. In such case, the deflector structure does not extend along a chassis of the truck unit but only forms a barrier laterally and above the gap between the cab and the trailer. Still in such case, the lateral sides may extend substantially vertically. The upper side may extend substantially horizontally or in a plane forming a non-zero angle with a horizontal plane being less than 45°, or less than 30° for example.

In some examples, the inflated configuration of at least one of the bouncy cushions, for example of several or all bouncy cushions, of the flexible frame may not be adjustable.

In some examples, the inflated configuration of at least one of the bouncy cushions, preferably of several or all bouncy cushions, of the flexible frame may be adjustable.

"Adjustable" means that the global shape of the bouncy cushion(s) may be adapted by more or less inflating the bouncy cushion(s), i.e. by injecting more or less gas in the bouncy cushion(s), i.e. by putting a more or less strong pressure in the bouncy cushion(s). A technical benefit may include the possibility of adjusting the inflated configuration in order to adapt the deflector structure to the gap between the truck unit and a particular trailer. Thus, a truck unit may tow different types of trailers, its deflector structure may be adapted to each type of trailers and the resulting gap between the cab and the trailer.

The flexible frame may comprise a plurality of pairs of substantially parallel bouncy cushions between which the flexible canvas passes, being notably pinched between them. The distance between the bouncy cushions of a same pair is adapted to a particular technical solution. The distance between the bouncy cushions of a same pair and the bouncy cushions of another pair is adapted to a particular technical solution. A technical benefit may be that the flexible canvas may be maintained between several pairs of bouncy cushions. Another technical benefit may be that the pair of bouncy cushions may have more stiffness than single bouncy cushions to hold or guide the flexible canvas. The flexible canvas is advantageously tensed in the inflated configuration of the bouncy cushions.

When the deflector structure is U-shaped with one upper side and two lateral sides, the flexible frame may comprise at least one single bouncy cushion or one pair of bouncy cushions at each corner between the upper side and a lateral side. The flexible frame may comprise a single bouncy cushion or a pair of bouncy cushions in each lateral side, for example in a lower portion thereof. In such case, the deflector structure may comprise four single bouncy cushions or four pairs of bouncy cushions. A mix between single bouncy cushions and pairs of bouncy cushions may also be possible.

The bouncy cushions may be configured to have at least one partially inflated configuration and/or one not-inflated configuration and one fully inflated configuration, said inflated configuration being a partially inflated configuration or a fully inflated configuration. There may be several different inflated configurations of a bouncy cushion. In a partially inflated configuration, the pressure inside the bouncy cushion(s) may be less than a maximum pressure. In the fully inflated configuration, the pressure inside the bouncy cushion(s) is equal to the maximum pressure. The maximum pressure may be a pressure within the bouncy cushion that can allow to obtain the fully inflated configuration without creating plastic deformation of the bouncy cushion or without damaging, for example tearing, the bouncy cushion. Such maximum pressure may be predetermined At least one bouncy cushion may have a substantially elongated external shape, at least in the inflated configuration. In such case, the bouncy cushion may extend between one first end fixed to the cab and one second end being a free end.

In this example, said at least one bouncy cushion may have a shape of a tube. The section of such a tube may be circular or have another section shape. The section of said at least one bouncy cushion, for example of the tube forming the bouncy cushion, may be constant. In a variant, the section of said at least one bouncy cushion may vary.

At least one bouncy cushion may have an external shape configured such that in the inflated configuration, it forms at least one curvature. In a particular example, an external shape of at least one bouncy cushion comprises a groove in a not-inflated or partially inflated configuration in such a way that in a full inflated configuration, it forms a curvature at the place of the groove. A technical benefit may be the possibility of adapting a shape of the deflector structure in case the rear side of the cab does not have the same dimensions as the front side of the trailer for example. The external shape of at least one bouncy cushion may similarly comprise several grooves.

When the flexible frame comprises a plurality of pairs of substantially parallel bouncy cushions between which the flexible canvas passes, in such a pair of substantially parallel bouncy cushions, one of them may be shorter than the other one, at least in the inflated configuration. Such an arrangement, with one bouncy cushion being shorter than the other one, may be made by an inflated configuration of one bouncy cushion being different, i.e., by injecting more or less gas, from the inflated configuration of the other one. Alternatively, or in combination, such an arrangement may be due to the shape of the bouncy cushions, one being for example shorter than the other one in a not-inflated state.

At least two bouncy cushions may be aligned with each other, a free end of one of them facing an end of the other one, the aligned bouncy cushions being for example attached to one another at their ends facing one another. In such case, the said at least two bouncy cushions that are aligned with each other may have different shapes and/or lengths, at least in the inflated configuration. Such a configuration with two aligned bouncy cushions may exist in a pair of bouncy cushions of the flexible frame. In such case, one of the bouncy cushions of the pair may have only one bouncy cushion and the other of the bouncy cushions of the pair may have two aligned bouncy cushions. The aligned bouncy cushions may allow more adaptability of the shape of the deflector structure.

The inflated configuration of the bouncy cushions of the flexible frame, for example of two aligned bouncy cushions and/or of two bouncy cushions substantially parallel and close together, may be different and specific for each bouncy cushion.

The flexible frame may comprise a plurality of single bouncy cushions guiding the flexible canvas and being distant from one another. In such case, the section of the single bouncy cushions may be large enough to have some stiffness to hold the flexible canvas for example.

In an example, the deflector structure may further comprise at least one rigid arm, preferably at least two rigid arms, each of the rigid arm(s) being fixed to a bouncy cushion, preferably to a free end thereof, and a pivot to which the rigid arm(s) is or are pivotably attached in such a way that each rigid arm is guiding and holding in said inflated configuration the bouncy cushion to which it is fixed. A technical benefit is that the flexible frame may be held by the rigid arm(s) away from the cab. The pivot may be fixed to a chassis of the truck unit, for example extending vertically from the chassis, notably in a central part of the chassis relative to the lateral sides of the chassis. When there are two rigid arms and when the pivot is fixed to a central part of the chassis, the rigid arms may extend symmetrically relative to a central longitudinal plane of the chassis, from the pivot to the lateral sides of the truck unit.

In an example, the deflector structure may further comprise at least one adjustable tightened string configured to hold the deflector structure in the inflated configuration, according to dimensions and shape of said gap. In such example, the deflector structure advantageously comprises several adjustable tightened strings configured to hold the flexible frame and/or the flexible canvas. In such case, the strings may be fixed on the one hand respectively to different several points of the flexible frame and/or flexible canvas and on the other hand to at least one attachment point and may be tightened in the inflated configuration of the flexible frame.

Arm(s) and string(s) may be simultaneously present in a same deflector structure.

According to a second aspect of the disclosure, a truck unit comprising the deflector structure as recited hereabove is disclosed, wherein the truck unit is configured to hold the deflector structure and to inflate the bouncy cushions from a not-inflated or partly inflated configuration to a partly inflated configuration or full inflated configuration. The second aspect of the disclosure may seek to improve ergonomics of a truck having a truck unit towing a trailer. A technical benefit may include the lightness of such a deflector structure. Another technical benefit may be the possibility to adjust the deflector structure to a particular assembly truck unit-trailer. When changing the trailer to be towed by the truck unit, an adjustment of the deflector structure to the new truck unit-trailer gap may be made by inflating more or less gas within all or part of the bouncy cushions.

In some examples, the pneumatic system of the truck unit may be configured to inflate the bouncy cushions. A technical benefit may be to use the existing pneumatic system for the deflector structure. Thus, bringing the deflector structure onto the truck unit may be easy, with the fixation of the deflector structure and the addition of a tube system between the pneumatic system and the bouncy cushions.

The truck unit may comprise a fastening system for fastening the deflector structure to the cab.

The truck unit may comprise a tube system between the pneumatic system and the bouncy cushions so as to inject gas, for example air, within the bouncy cushions. The tubes of the tube system may have a diameter less than 10 mm, for example comprised between around 5 mm and 6 mm.

The truck unit may comprise at least part of a camera and/or sensors for measuring distances in the surroundings, at least one gas valve to be opened or closed, a control system for receiving data from the camera and/or sensors, calculating and determining an inflated configuration of the deflector structure and for controlling the injection of gas, especially air, in the bouncy cushions in order to obtain the determined inflated configuration of the deflector structure. The control system may also be configured to control a movement of the rigid arm(s) if any, and/or a tightening of the string(s) when present.

The truck unit may comprise at least one housing for housing at least part of the deflector structure, at least in a not-inflated configuration. Such housing(s) may comprise at least one box fixed to a rear side of the cab.

According to a third aspect of the disclosure, a method for adjusting a deflector structure as recited hereabove is disclosed, the method comprising:

- calculating the dimensions and shape of the gap between the cab and the trailer,
- based on the dimensions and shape of said gap, determining an inflated configuration of the deflector structure in order to form a barrier surrounding at least part of said gap,
- inflating the bouncy cushions of said deflector structure to obtain said determined inflated configuration.

A technical benefit of this aspect may be to adapt a deflector structure mounted on a truck unit to a particular trailer to be towed by the truck unit.

This method may be implemented only once when a new trailer to be towed is attached to the truck unit. The method may be implemented when starting an engine of the truck unit. Then, when the engine is stopped, the deflector structure may be kept in the determined inflated configuration. Alternatively, when the engine is stopped, the deflector structure may be deflated to a not-inflated configuration and stored in one or several housings, for example, automatically or manually. Then, when the engine is restarted, with the same trailer being attached to the truck unit, the deflector structure may be kept in the determined inflated configuration or re-inflated in the determined inflated configuration. Such determined inflated configuration may be stored in a memory. In such case, the two first phases of the method, which are machine learning phases, are not reiterated. It is only when another trailer is attached to the truck unit that the whole method may be implemented again.

When the truck unit comprises at least one rigid arm, the method may comprise pivoting the rigid arm(s) in a predetermined configuration in order to maintain the flexible frame and canvas in such configuration. The method may also comprise previously calculating such predetermined configuration of the rigid arm(s).

When the truck unit comprises at least one tightening string, the method may comprise tightening said string(s) in a predetermined configuration in order to maintain the flexible frame and canvas in such configuration. The method may also comprise previously calculating such predetermined configuration of the string(s).

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

FIG. 1 is a schematic perspective view of a truck unit according to prior art.

FIG. 2 is a schematic side view of a truck unit towing a trailer, according to prior art.

FIG. 3 is a schematic side view of a truck unit towing a trailer according to prior art.

FIG. 4 is a schematic perspective view of a truck unit according to one example.

DETAILED DESCRIPTION

Figure 5:
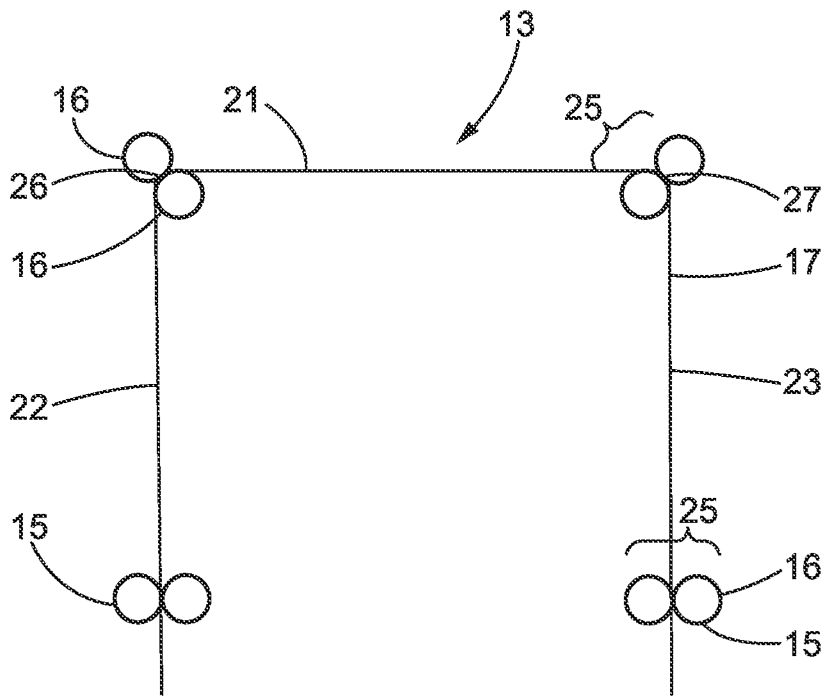
FIG. 5 is a schematic rear view of a deflector structure according to one example.

Aspects set forth below represent the necessary information to enable those skilled in the art to practice the disclosure.

FIG. 3 shows a truck unit 1 towing a trailer 2. This truck unit 1 is electrically powered in this example. The gap G' between truck cab 4 and trailer 2 is bigger than gap G of FIG. 2. The deflector 3 of prior art is too short for closing such gap G', with the double arrow showing the distance D' between the truck cab 4 and the trailer 2.

FIG. 4 shows a truck unit 10 according to an example of the disclosure. The truck unit 10 comprises a cab 14 and is configured to tow a trailer 12 not shown in this figure, but similar to the one of FIG. 3 and leaving a space or gap between the truck cab 14 and the trailer to be towed similar to gap G'. The truck unit 10 comprises a deflector structure 13 configured to form at least partly a barrier surrounding the gap, similar to gap G' of FIG. 3, between the cab 14 and the trailer 12 to be towed by the truck unit 10. The deflector structure 13 comprises a flexible frame 15 fixed to the cab 14, the flexible frame 15 comprising a plurality of bouncy cushions 16 extending rearwardly towards the trailer at least in an inflated configuration. The deflector structure 13 also comprises at least a flexible canvas 17 held by the flexible frame 15 and/or by the cab 14 and being guided by the bouncy cushions 16.

The deflector structure 13 may improve ergonomics of the truck unit 10 when towing the trailer 12, especially but not exclusively when the truck unit 10 is electrically powered. Furthermore, the deflector structure 13 is light.

The truck unit 10 comprises a chassis 11 to which the trailer 12 is to be attached.

The cab 14 comprises a rear side 18 to which the flexible frame 15, notably at least part of the bouncy cushions 16 and/or the flexible canvas 17, may be fixed. The cab 14 comprises in this example of FIG. 4, on an upper side 19, a rigid deflector 20 to the rear side 33 of which at least part of the bouncy cushions 16 and/or the flexible canvas 17 may be fixed.

The flexible canvas 17 may be a cloth, for example a water-repellant cloth, the cloth being waterproof or not, having at least one layer, for example one layer. The cloth may be made of a synthetic material, for example reinforced on an external side so as to be tear resistant. The flexible canvas 17 may be fixed to the flexible frame 15. The bouncy cushions 16 may be made of a waterproof flexible cloth. The bouncy cushions 16 may not be elastically deformable. In some examples, the flexible frame 15 and the flexible canvas 17 may be made of a single piece.

The bouncy cushions 16 may be inflated with gas, especially with ambient air. In the example of FIG. 4, the inflated configuration of the bouncy cushions 16 of the flexible frame 15 is not adjustable.

As shown in FIG. 5, the deflector structure 13 may be U-shaped, extending according to three sides, one upper side 21 and two lateral sides 22 and 23. Upper side 21 and lateral side 22 are visible in FIG. 4. In these examples, the deflector structure 13 is not provided to extend along a chassis 11 of the truck unit 10 but only forms a barrier laterally and above the gap between the cab 14 and the trailer 12, when in place and in an inflated configuration. The lateral sides 22 and 23 may extend substantially vertically. The upper side 21 extends substantially horizontally in this example.

The flexible frame 15 comprises a plurality of, in this example four, pairs 25 of substantially parallel bouncy cushions 16 between which the flexible canvas 17 passes, being notably pinched between them. In this example, the bouncy cushions 16 of a same pair 25 are close to each other and are distant from bouncy cushions 16 of another pair 25. The flexible canvas 17 may be maintained between several pairs 25 of bouncy cushions 16. The flexible canvas 17 is, in this example, tensed in the inflated configuration of the bouncy cushions 16.

The flexible frame 15 comprises a pair 25 of bouncy cushions 16 at each corner 26 and 27 between the upper side 21 and the lateral sides 22 and 23 and a pair 25 of bouncy cushions 16 in each lateral side 22 or 23, in this example in a lower portion thereof.

In this example, the bouncy cushions 16 have a circular cross section in an inflated configuration.

In some examples, the inflated configuration of at least one bouncy cushion 16, preferably of several or all bouncy cushions 16, of the flexible frame 15 may be adjustable.

The bouncy cushions 16 may be configured to have at least one partially inflated configuration and/or one not-inflated configuration and one fully inflated configuration, said inflated configuration being a partially inflated configuration or a fully inflated configuration. There may be several inflated configurations of a bouncy cushion 16. In a partially inflated configuration, such as shown in FIG. 6, the pressure inside the bouncy cushions 16 is less than the maximum pressure, and the bouncy cushions 16 have a shortened shape.

Figure 7:
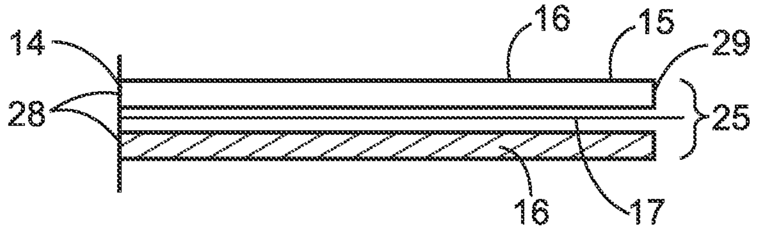
FIG. 7 is an isolated schematic partial side view of an example of deflector structure according to one example.

In the fully inflated configuration as in the example of FIG. 7, the pressure inside the bouncy cushions 16 is equal to the maximum pressure. The maximum pressure may be a pressure be put within the bouncy cushion 16 that can allow to obtain the fully inflated configuration without creating plastic deformation of the bouncy cushion 16 or without damaging, for example tearing, the bouncy cushion 16.

Figure 6:
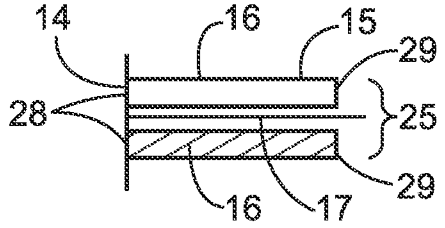
FIG. 6 is an isolated schematic partial side view of an example of deflector structure according to one example.

In the examples of FIGS. 6 and 7, bouncy cushions 16 have a substantially elongated external shape, at least in the inflated configuration. In such case, the bouncy cushion 16 extends between one first end 28 fixed to the cab 14 and one second end 29 being a free end.

In these examples, the bouncy cushions 16 have a shape of a tube. The cross section of such a tube may be circular or have another section shape, may be constant or not. The section of said at least one bouncy cushion, for example of the tube forming the bouncy cushion, is constant in these examples.

In a variant, the cross section of said at least one bouncy cushion may vary.

Figure 8:
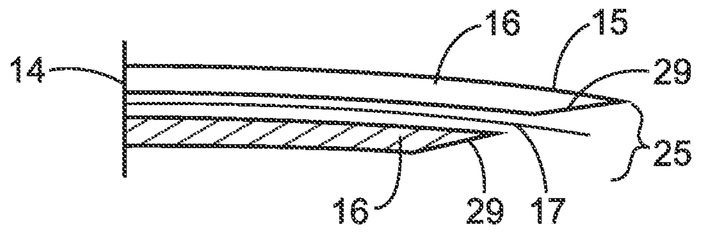
FIG. 8 is an isolated schematic partial side view of an example of deflector structure according to one example.

In the example shown in FIG. 8, the bouncy cushions 16 have an external shape configured such that in the inflated configuration, it forms at least one curvature.

The flexible frame 15 shown in FIG. 8 comprises a pair 25 of substantially parallel bouncy cushions 16 between which the flexible canvas 17 passes. One of the bouncy cushions 16 is shorter than the other one, at least in the inflated configuration, as shown in FIG. 8. Such an arrangement, with one bouncy cushion 16 being shorter than the other one, may be made by an inflated configuration of one bouncy cushion 16 being different, i.e., by injecting more or less gas, from the inflated configuration of the other one. Alternatively, or in combination, such an arrangement may be due to the shape of the bouncy cushions 16, one being for example shorter than the other one in a not-inflated state. Such an arrangement may be provided for adjusting the shape of the deflector structure 13.

The second end 29 of the bouncy cushions 16 is not perpendicular to the elongated part thereof in this example of FIG. 8 but inclined relative to the elongated part.

At least two bouncy cushions 16 may be aligned with each other, a second end 29 of one of them facing another first end 30 of the other bouncy cushion 16, and the second end 29 and the other first end 30 for example being in contact with one another. This is the case in examples shown in FIGS. 9, 10 and 11. In such cases, one of the bouncy cushions 16 of the pair 25 has only one bouncy cushion 16 and the other of the bouncy cushions 16 of the pair 25 has two aligned bouncy cushions 16. The aligned bouncy cushions 16 may allow more adaptability of the shape of the deflector structure 13.

Figure 9:
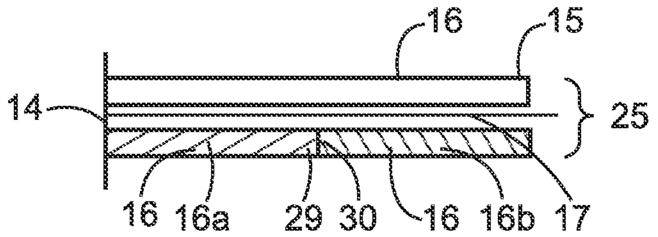
FIG. 9 is an isolated schematic partial side view of an example of deflector structure according to one example.
Figure 10:
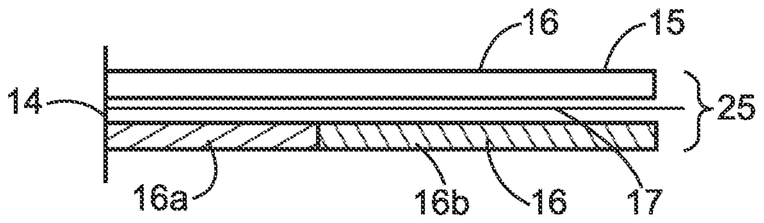
FIG. 10 is an isolated schematic partial side view of an example of deflector structure according to one example.

The said at least two bouncy cushions 16, namely 16*a* and 16*b*, that are aligned with each other have the same length and the same shape in the examples shown in FIGS. 9 and 10. Such a configuration with two aligned bouncy cushions 16*a*, 16*b* may exist in a pair 25 of bouncy cushions 16 of the flexible frame 15, as is the case in the examples shown in FIG. 9 to 11. In FIG. 9, the bouncy cushions 16 are in a shortened state, being partially inflated. In FIG. 10, the bouncy cushions 16 are in an extended state, being fully inflated.

Figure 11:
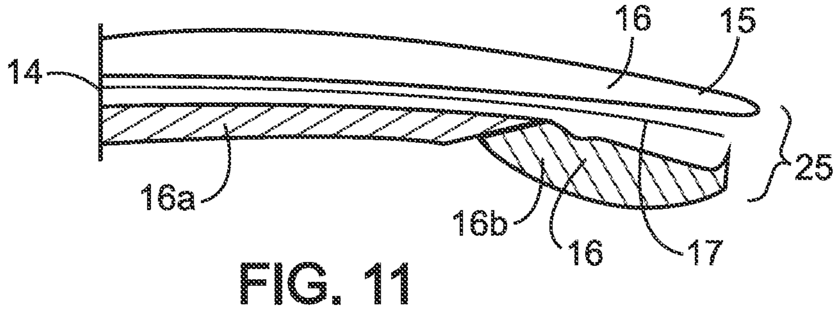
FIG. 11 is an isolated schematic partial side view of an example of deflector structure according to one example.

In the example shown in FIG. 11, the bouncy cushions 16*a* and 16*b* have different shapes and lengths, at least in the inflated configuration.

The inflated configuration of the bouncy cushions 16 of the flexible frame 15, for example of two aligned bouncy cushions 16 and/or of two bouncy cushions 16 substantially parallel and close together, may be different and specific for each bouncy cushion 16.

The flexible frame 15 may comprise a plurality of single bouncy cushions 16 guiding the flexible canvas 17 and being distant from one another. In such case shown in FIG. 12 and FIG. 13, the section of the single bouncy cushions 16 may be large enough to have some stiffness to hold the flexible canvas for example.

Figure 12:
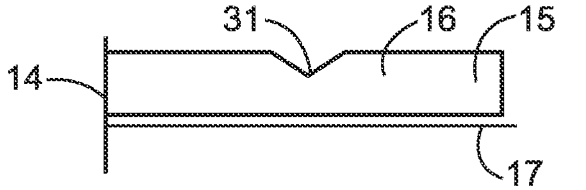
FIG. 12 is an isolated schematic partial side view of an example of deflector structure according to one example.
Figure 13:
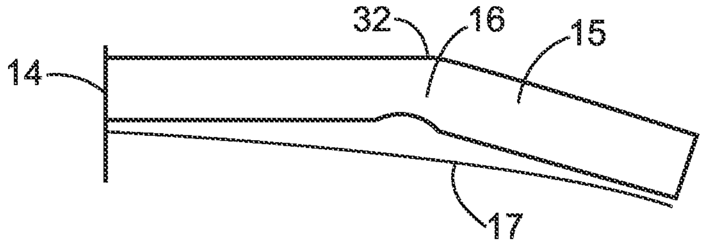
FIG. 13 is an isolated schematic partial side view of an example of deflector structure according to one example.

In the particular example of FIG. 12 and FIG. 13, an external shape of the bouncy cushion 16 comprises a groove 31 in a not-inflated or partially inflated configuration shown in FIG. 12 in such a way that in a full inflated configuration shown in FIG. 13, it forms a curvature 32 at the place of the groove. The external shape of at least one bouncy cushion 16 may similarly comprise several grooves.

Figure 14:
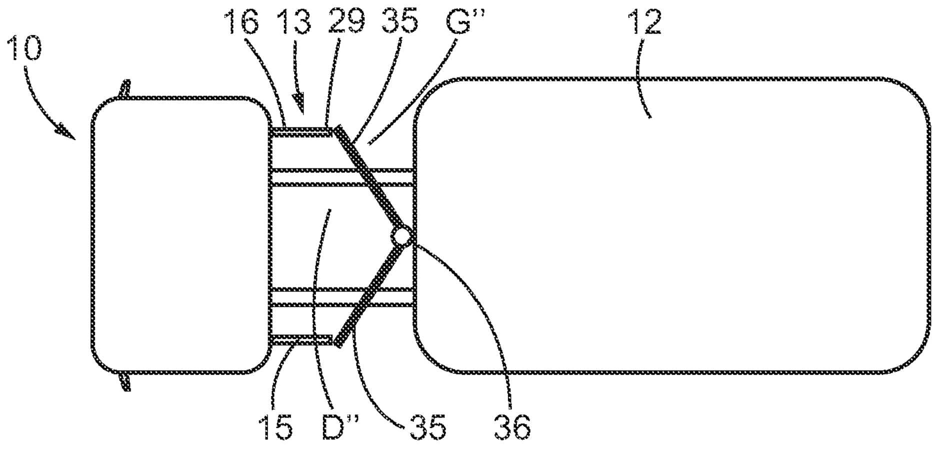
FIG. 14 is a schematic top view of an exemplary truck unit towing a trailer according to one example, with arms in a first position.
Figure 15:
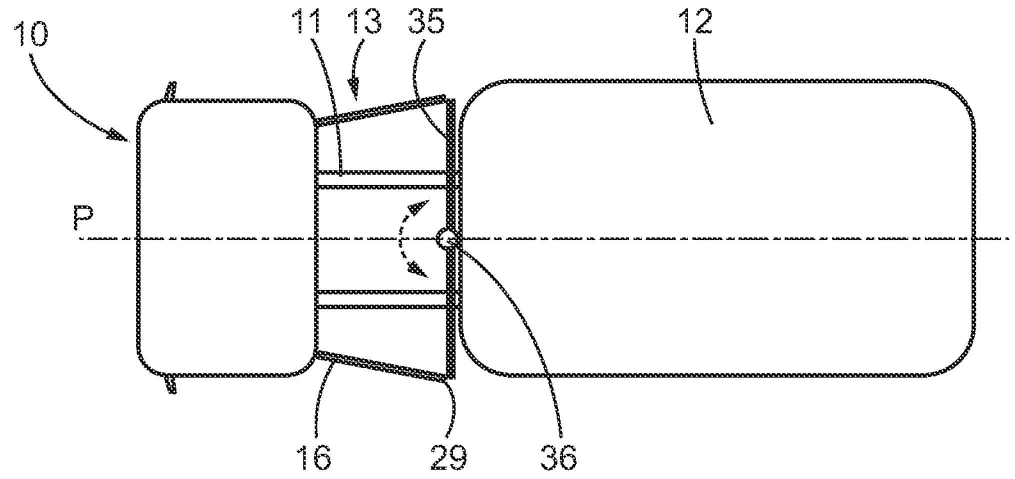
FIG. 15 is a schematic top view the truck unit towing a trailer according to the example of FIG. 14, with arms in a second position.

In an example shown in FIGS. 14 and 15, the deflector structure 13 has to form a barrier at least partly around the gap G" due to the distance D" between the truck cab 14 and the trailer 12. In this example, the deflector structure 13, which is U-shaped as in the examples of FIGS. 4 and 5, further comprises at least one rigid arm 35, in this example at least two rigid arms 35. Each of the rigid arms 35 is fixed to a bouncy cushion 16, in this example to a free end 29 thereof. The rigid arms 35 are pivotably attached to a pivot 36 in such a way that each rigid arm 35 is guiding and holding in said inflated configuration the bouncy cushion 16 to which it is fixed, after pivoting from a position shown in FIG. 14 to a position shown in FIG. 15 according to the dotted curved double arrow shown in this figure. The pivot 36 may be fixed to the chassis 11 of the truck unit 10, for example extending vertically from the chassis 11, in this example in a central part of the chassis 11 relative to the lateral sides of the chassis 11. In this example, the rigid arms 35 extend symmetrically relative to a central longitudinal vertical plane P of the chassis, from the pivot 36 to the lateral sides of the truck unit 10.

Figure 16:
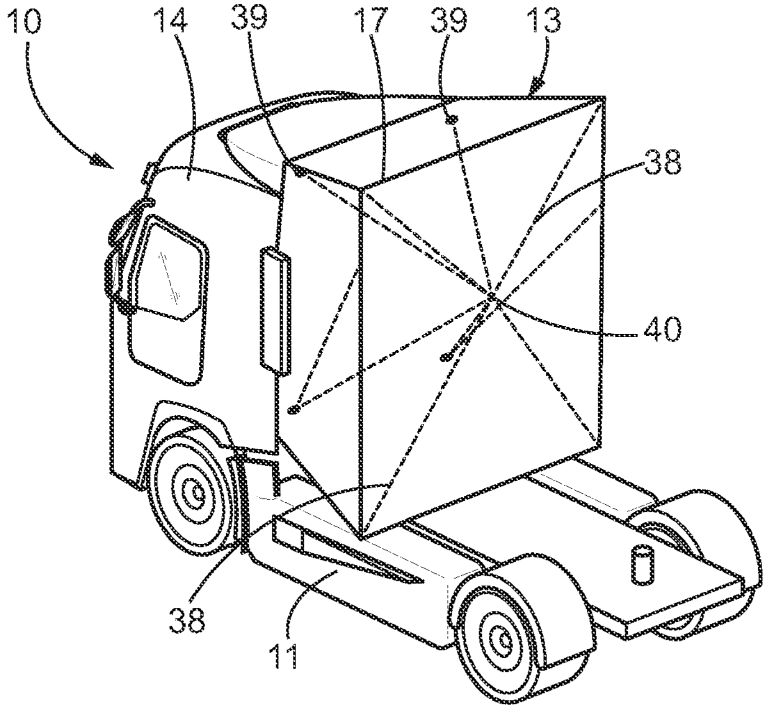
FIG. 16 is a schematic perspective view of a truck unit according to one example.
Figure 17:
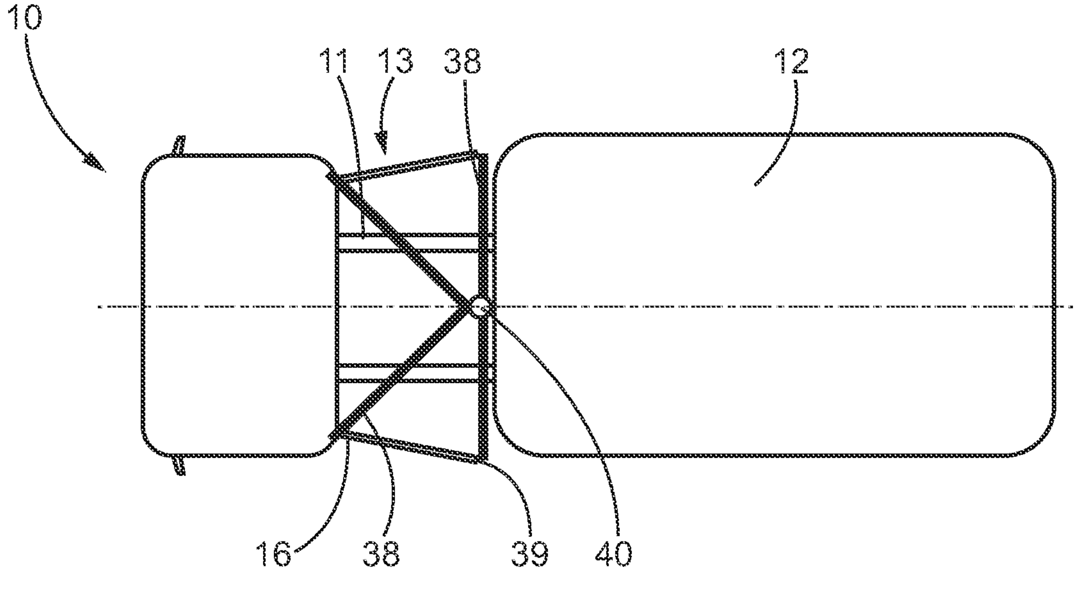
FIG. 17 is a schematic to view of a truck unit towing a trailer according to one example.
Figure 18:
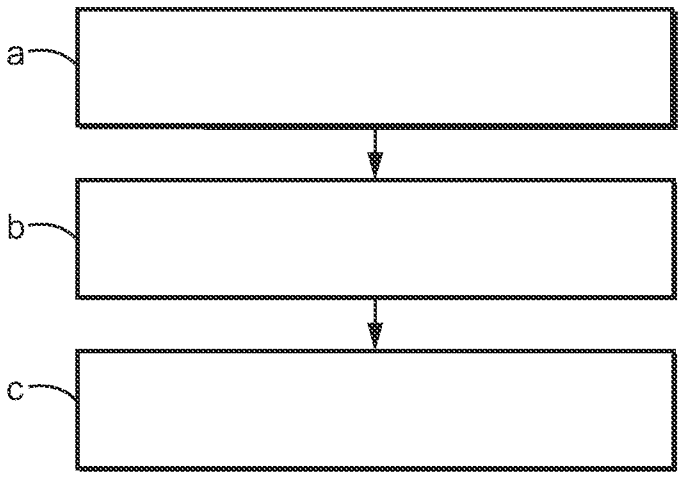
FIG. 18 is a block diagram of a method for adjusting a deflector structure, according to one example.

In an example shown in FIGS. 16 and 17, the deflector structure 13 further comprises at least one adjustable tightened string 38 configured to hold the deflector structure 13 in the inflated configuration, according to dimensions and shape of the gap. In such example, the deflector structure 13 comprises several adjustable tightened strings 38 configured to hold the flexible frame 15 and/or the flexible canvas 17. In such case, the strings 38 may be fixed on the one hand to several points 39 of the flexible frame 15 and/or flexible canvas 17 and on the other hand to at least one attachment point 40 and tightened in an inflated configuration of the flexible frame 15.

Arm(s) and string(s) may be simultaneously present in a same deflector structure 13.

The truck unit 10 is configured to hold the deflector structure 13 and to inflate the bouncy cushions 16 from a not-inflated or partly inflated configuration to a partly inflated configuration or full inflated configuration. It may improve ergonomics of a truck having a truck unit towing a trailer. A technical benefit may include the lightness of such a deflector structure 13. It is possible to adjust the deflector structure 13 to a couple truck unit 10-trailer 12. When changing the trailer 12 to be towed by the truck unit 10, an adjustment of the deflector structure 13 to the new cab 14-trailer 12 gap may be made by inflating more or less gas within all or part of the bouncy cushions 16.

In some examples, the existing pneumatic system of the truck unit 10 may be configured to inflate the bouncy cushions 16. Bringing the deflector structure 13 onto the truck unit 10 may be easy, with the fixation of the deflector structure 10 and the addition of a tube system between the pneumatic system and the bouncy cushions 16.

The truck unit 10 may comprise a fastening system for fastening the deflector structure 13 to the cab 14. Different phases of a method for adjusting a deflector structure 13 are shown in FIG. 17. The method comprises a/calculating the dimensions and shape of the gap between the cab 14 and the trailer 12, then b/based on the dimensions and shape of said gap, determining an inflated configuration of the deflector structure 13 in order to form a barrier surrounding said gap, and then c/inflating the bouncy cushions 16 of said deflector structure 13 to obtain said determined inflated configuration.

A technical benefit of this aspect may be able to adapt a deflector structure 13 mounted on a truck unit to a particular trailer to be towed by the truck unit.

This method may be implemented only once when a new trailer 12 to be towed is attached to the truck unit 10. The method may be implemented when starting an engine of the truck unit 10. Then, when the engine is stopped, the deflector structure 13 may be kept in the determined inflated configuration. Alternatively, the deflector structure 13 may be deflated to a not-inflated configuration and stored in one or several housings, for example, automatically or manually. Then, when the engine is restarted, with the same trailer 12 being attached to the truck unit 10, the deflector structure 13 may be kept in the determined inflated configuration or re-inflated in the determined inflated configuration. Such determined inflated configuration is stored in a memory. In such case, the two first phases of the method, which are machine learning phases, are not reiterated. It is only when another trailer 12 is attached to the truck unit 10 that the whole method may be implemented again.

In particular to implement the method, the truck unit 10 may comprise a tube system between the pneumatic system and the bouncy cushions so as to inject gas, for example air, within the bouncy cushions 16. The tubes of the tube system may have a diameter less than 10 mm, for example comprised between around 5 mm and 6 mm.

The truck unit 10 may comprise at least part of a camera and/or sensors for measuring distances in the surroundings, at least one gas valve to be opened or closed, a control system for receiving data from the camera and/or sensors, calculating and determining an inflated configuration of the deflector structure 13 and for controlling the injection of gas, especially air, in the bouncy cushions in order to obtain the determined inflated configuration of the deflector structure. The control system may also be configured to control a movement of the rigid arm(s) if any, and/or a tightening of the string(s) when present.

The truck unit 10 may also comprise at least one housing for housing at least part of the deflector structure, at least in a not inflated configuration. Such housing(s) may comprise a box fixed to a rear side of the cab.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A deflector structure for a truck unit having a cab, the deflector structure being configured to form a barrier surrounding at least part of a gap between the cab and a trailer to be towed by the truck unit, the deflector structure comprising:

a flexible frame fixed to the cab, the flexible frame comprising a plurality of bouncy cushions extending rearwardly towards the trailer at least in an inflated configuration; and at least a flexible canvas held by the flexible frame and/or by the cab and guided by the bouncy cushions to form the barrier;

wherein the flexible frame comprises a plurality of pairs of substantially parallel bouncy cushions between which the flexible canvas passes, being notably pinched between them.

2. The deflector structure of claim 1, wherein the inflated configuration of at least one of the bouncy cushions of the flexible frame is adjustable.

3. The deflector structure of claim 1, wherein the bouncy cushions are configured to have at least one partially inflated configuration and/or one not-inflated configuration and one fully inflated configuration, the inflated configuration being a partially inflated configuration or a fully inflated configuration.

4. The deflector structure of claim 1, wherein at least one bouncy cushion has a substantially elongated external shape, at least in the inflated configuration.

5. The deflector structure of claim 1, wherein at least one bouncy cushion has an external shape configured such that in the inflated configuration, it forms at least one curvature, in particular an external shape of at least one bouncy cushion comprises a groove in a not-inflated or partially inflated configuration in such a way that in a fully inflated configuration, it forms a curvature at the place of the groove.

6. The deflector structure of claim 1, wherein, in a pair of substantially parallel bouncy cushions, one of them is shorter than the other one, at least in the inflated configuration.

7. The deflector structure of claim 1, wherein at least two bouncy cushions are aligned with each other, a free end of one of them facing an end of the other one.

8. The deflector structure of claim 7, wherein the at least two bouncy cushions that are aligned with each other have different shapes and/or lengths, at least in the inflated configuration.

9. The deflector structure of claim 1, wherein the flexible frame comprises a plurality of single bouncy cushions guiding the flexible canvas and being distant from one another.

10. The deflector structure of claim 1, further comprising at least one rigid arm, each of the rigid arm(s) being fixed to a bouncy cushion, preferably to a free end thereof, and a pivot to which the rigid arm(s) is or are pivotably attached in such a way that each rigid arm is guiding and holding in the inflated configuration the bouncy cushion to which it is fixed.

11. The deflector structure of claim 1, further comprising at least one adjustable tightened string configured to hold the deflector structure in the inflated configuration, according to dimensions and shape of the gap.

12. A truck unit comprising the deflector structure of claim 1, wherein the truck unit is configured to hold the deflector structure and to inflate the bouncy cushions from a not-inflated or partly inflated configuration to a partly inflated configuration or full inflated configuration.

13. The truck unit of claim 12, wherein a pneumatic system of the truck unit is configured to inflate the bouncy cushions.

14. A method for adjusting the deflector structure of claim 1, comprising:

calculating the dimensions and shape of the gap between the cab and the trailer;

based on the dimensions and shape of the gap, determining an inflated configuration of the deflector structure in order to form a barrier surrounding at least part of the gap; and inflating the bouncy cushions of the deflector structure to obtain the determined inflated configuration.

* * * * *